(12) United States Patent
Fox et al.

(10) Patent No.: US 6,445,393 B1
(45) Date of Patent: Sep. 3, 2002

(54) THREE-DIMENSION GRAPHICS RENDERING APPARATUS AND METHOD THEREFOR

(75) Inventors: Thomas Winters Fox, Georgetown; Barry L. Minor, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/310,910

(22) Filed: May 13, 1999

(51) Int. Cl.$^7$ .............................................. G06T 15/60
(52) U.S. Cl. ...................... 345/426; 345/427; 345/615
(58) Field of Search ................................ 345/419, 426, 345/427, 615

(56) References Cited

U.S. PATENT DOCUMENTS 5,025,407 A * 6/1991 Gulley et al. ............... 364/754
5,563,989 A * 10/1996 Billyard ........................ 345/42

* cited by examiner

*Primary Examiner*—Mark Zimmerman
*Assistant Examiner*—Kimbinh T. Nguyen
(74) *Attorney, Agent, or Firm*—Barry S. Newberger; Winstead Sechrest & Minick P.C.; Leslie A. Van Leeuwen

(57) ABSTRACT

An apparatus and method for three-dimensional graphic rendering are implemented. For each vertex on a surface of a graphic to be rendered, the scalar product of the unit normal to the surface and a half vector (the vector bisecting an angle between a unit vector in a direction of observation, the "eye" vector and a unit vector in a direction of a light source, the "light vector"), is generated outside of a graphics engine. Additionally, a second scalar product, between the unit normal and the unit vector in the direction of the light source is generated. These scalar products are loaded into two predetermined components of the unit normal, and sent to the graphics engine in lieu of the corresponding values of the components of the unit normal. In the graphics engine, components of the light vector and the half vector are assigned respective predetermined values, wherein the calculation of the two scalar products by the graphics engine produces the correct results.

33 Claims, 3 Drawing Sheets

THREE-DIMENSION GRAPHICS RENDERING APPARATUS AND METHOD THEREFOR

TECHNICAL FIELD

The present invention relates in general to data processing systems, and in particular, to three-dimensional graphics rendering in a data processing system.

BACKGROUND INFORMATION

When computing lighting data for three-dimensional (3D) graphics applications, it is customary to maintain and transmit a normal vector with every vertex of each object to be rendered. These normal vectors are transmitted to the graphics hardware or software that is rendering the object, and that uses them in conjunction with a vector to the object observation point ("eye vector") and vector to the light source ("light vector") to determine the lighting characteristics at the corresponding vertex. The normal vectors are provided by the graphics application generating the object that is to be rendered by the graphics engine.

Each normal vector requires that, in typical graphics implementations, twelve bytes of data be sent. This corresponds to four bytes representing each component in a 3D normal vector. This, in turn, places a significant burden on data buses, which may include input/output (I/O) buses and memory buses, when rendering 3D graphical objects in supporting the data rates generated by the graphical information at each vertex of the object. Moreover, data is typically fed to the graphics engine via I/O bus direct memory accesses (DMA). This, in turn, requires that cached vertex data must be cast out to memory where it can be retrieved by the graphics engine via a DMA. This increases the bus traffic even more. Moreover, caching the three components of each normal vector consumes cache memory.

In modern data processing systems, increases in central processing unit (CPU) speed have outstripped bus performance. Consequently, in the rendering of 3D graphics objects, the bus has become the bottleneck, not the CPU. Therefore, there is a need in the art, for apparatus and methods for reducing bus traffic, and increasing cache utilization in 3D graphics rendering operations.

SUMMARY OF THE INVENTION

The aforementioned needs are addressed by the present invention. Accordingly, there is provided, in a first form, a method of graphics rendering. The method includes the steps of generating a first scalar product of a first vector and a second vector, and outputting the first scalar product to a graphics engine in lieu of components of the first and second vectors.

There is also provided, in a second form, a data processing system that contains circuitry operable for generating a first scalar product of a first vector and a second vector. Also included is circuitry operable for outputting the first scalar product to a graphics engine in lieu of components of the first and second vectors.

Additionally, there is provided, in a third form, a computer program product operable for storage on program storage media. The program product is operable for graphics rendering, and includes programming for generating a first scalar product of a first vector and a second vector, and programming for outputting the first scalar product to a graphics engine in lieu of components of the first and second vectors.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
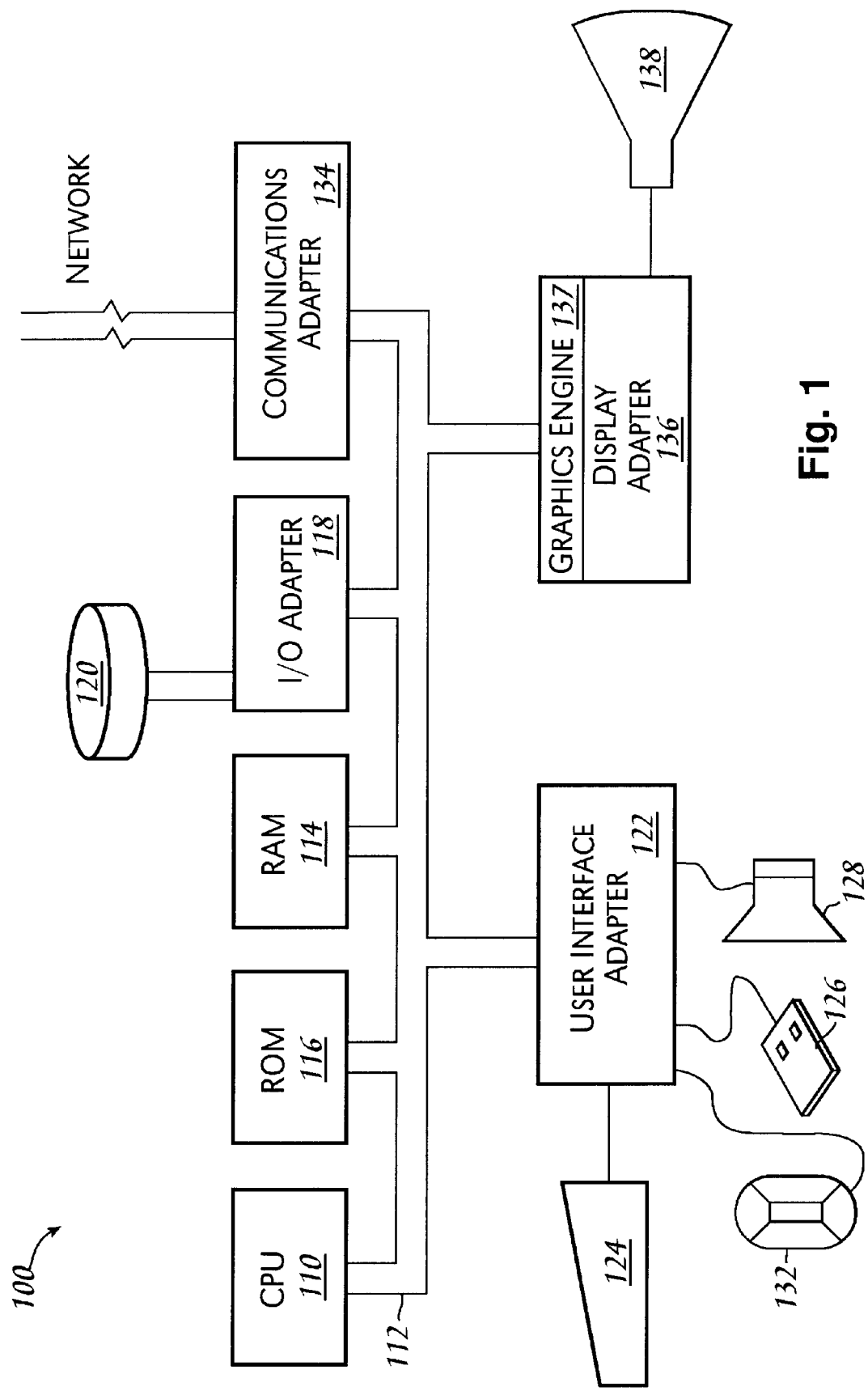
FIG. 1 illustrates, in block diagram form, a data processing system in accordance with an embodiment of the present invention.

The present invention provides a mechanism for reducing the volume of 3D graphics rendering data sent to a graphics engine in a data processing system. The dot products required in rendering the 3D graphic are computed, for each vertex, in the central processing unit (CPU). The dot products (which may also may be referred to as scalar products) are loaded into "y" and "z" components, respectively, of the normal vector for the corresponding vertex, whereby they are passed to the graphics engine. In the graphics engine, a "y" component of the light vector is assigned the value one and the other components are assigned the value zero. Similarly, a "z" component of the "H" vector is assigned the value one, and the other two components are assigned the value zero. When the graphics engine does its dot product calculations in rendering the graphic, the correct results are thereby obtained.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. Display adapter 136 may include hardware graphics engine 137. In this manner, a user is capable of inputting to the system throughout the keyboard 124, trackball 132 or mouse 126 and receiving output from the system via speaker 128 and display 138. Additionally, an operating system is used to coordinate the functions of the components of FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). In an alternative embodiment of the present invention, the graphics engine may be implemented in software which may be contained in ROM 116, RAM 114, or storage device 120 and loaded into RAM 114 for execution. Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
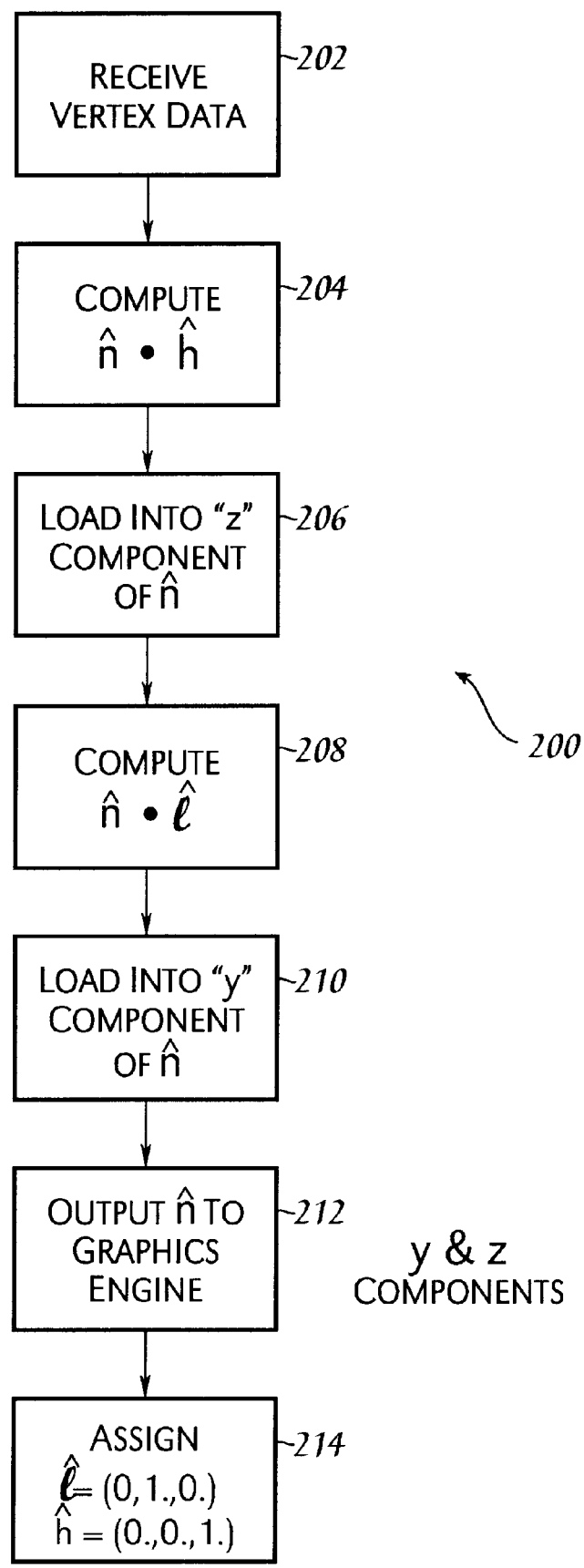
FIG. 2 illustrates, in flow chart form, a graphics rendering methodology in accordance with an embodiment of the present invention.
Figure 3:
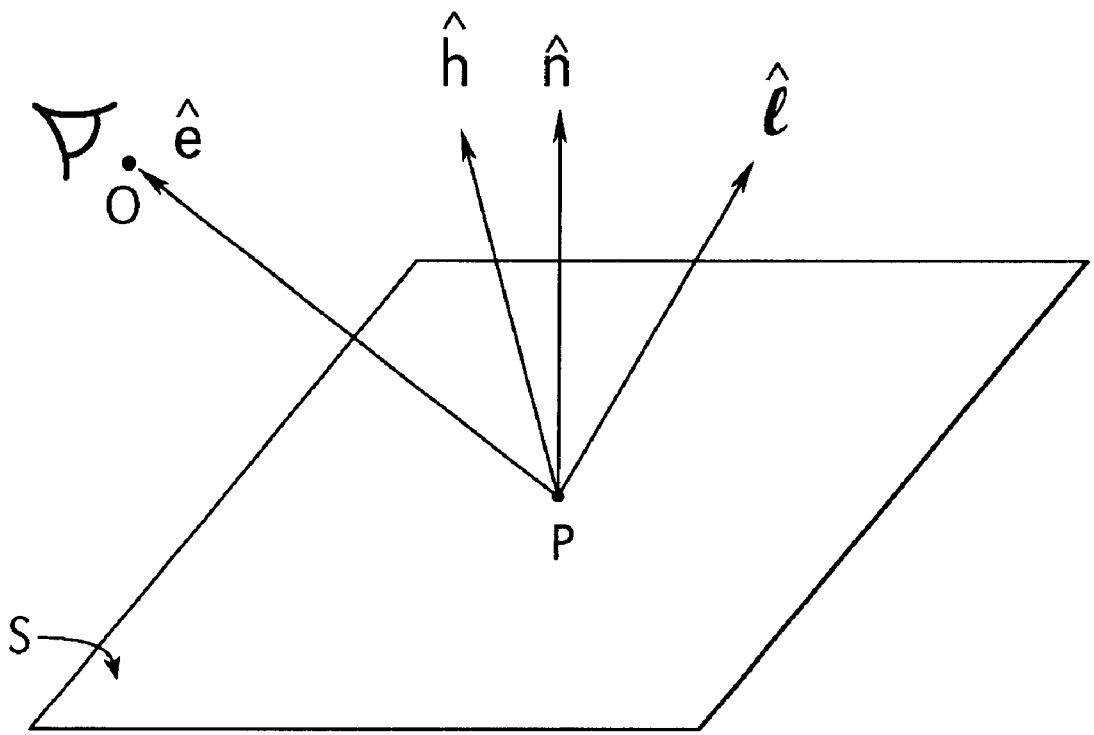
FIG. 3 illustrates, schematically, a vector diagram associated with a graphics vertex.

Refer now to FIG. 2 illustrating, in flow chart form, methodology 200 for graphics rendering in accordance with an embodiment of the present invention. In step 202, the values corresponding to the vectors at vertex P are received by methodology 200 from the 3D graphics application. An element, S, of the surface being rendered is illustrated in FIG. 3, along with the unit vectors at a vertex, P, on the surface element S. The vector, $\hat{l}$, represents a unit vector in the direction of the light source illuminating the surface being rendered. The half vector, $\hat{h}$, is a unit vector which bisects the angle between the unit vector $\hat{l}$ and a unit vector, $\hat{e}$, which is a unit vector in the direction of the observation point 0. The unit normal to the surface segment S is shown as the vector, $\hat{n}$, in FIG. 3. The graphics engine, which in alternative embodiments of data processing system 100 in FIG. 1 may be implemented alternatively in hardware and software, receives values for the vectors shown in FIG. 3 as packets of three floating-point values. The three values represent the "x", "y", and "z" components of the corresponding vector.

In step 204, the dot, or scalar, product between the unit normal, $\hat{n}$, and the half vector, $\hat{h}$, is computed. This dot product is used by the graphics engine in performing specular lighting calculations, in accordance with lighting graphics methodologies known in the art. See, e.g. JACKIE NIEDER, ET AL., OPEN GL PROGRAMMING GUIDE, at 191 (1993). In step 206, the dot product computed in step 204 is loaded into the "z" component of the output buffer for the unit normal.

In step 208, the dot product between the unit normal, $\hat{n}$, and the light unit vector, $\hat{l}$, is computed. This dot product is used by the graphics engine in calculating diffuse lighting. See, e.g. JACKIE NIEDER, ET AL., OPEN GL PROGRAMMING GUIDE, at 191–92 (1993) (using a "sum" vector, s corresponding to $\hat{h}$). In step 210, the dot product computed in step 208 is loaded into the "y" component of the output buffer for the unit normal.

In step 212, two components from steps 206 and 210 are passed to the graphics engine. This may, in an embodiment of the present invention, be implemented by a DMA (direct memory access engine), wherein step 212 corresponds to a castout of the unit normal from cache to system memory, and storage therein. In step 214, a light unit vector, $\hat{l}$, and a half vector, $\hat{h}$, are assigned the values (0., 1., 0.) and (0., 0., 1.), respectively. The notation for vector-valued quantities is standard wherein the values separated by commas represents the "x", "y", and "z" components of the vector.

In calculating diffuse and specular lighting, the graphics engine calculates the required dot products using its preexisting process. However, because of the values assigned in the graphics engine to the light vector and the half vector in step 202, of $\hat{n}\cdot\hat{h}$ by the graphics engine is simply to multiply the value of the dot product calculated in step 206 by one. Similarly, in calculating $\hat{n}\cdot\hat{l}$ the graphics engine just multiplies the value computed in step 210 by one. Although it appears that in using methodology 200 in accordance with the present invention that the dot product calculations are being done twice, the calculations may be done in parallel with other operations in a hardware implementation of the graphics engine. In a software implementation of the graphics engine, the dot product calculations may be done in a pipelined fashion whereby execution of the extraneous dot product calculations occupy CPU cycles that would otherwise be unused in any case. However, because only two values are passed to the graphics engine instead of three, bus bandwidth is reduced by approximately thirty percent, thereby conserving the resource that represents the bottleneck in the processing of the 3D graphics data. Additionally, cache space is conserved because only two floating-point numbers need to be stored in cache, rather than the three values that would otherwise need to be stored.

Furthermore, in an alternative embodiment of the present invention, a configurable graphics engine may be provided in which the dot product calculations performed by the graphics engine may be suppressed. In response to a configuration signal, the graphics engine turns off its scalar product calculation, and uses the dot products generated in steps 204 and 208, FIG. 2, directly. In such an embodiment, step 214, may be omitted in methodology 200, FIG. 2. In the embodiment of the present invention, the configuration signal may be provided by CPU 100, FIG. 1 under control of the operating system.

Although the present invention and its advantages have been described in detail, it should be understood that various changes, substitutions and alterations can be made herein without departing from the spirit and scope of the invention as defined by the appended claims.

What is claimed is:

1. A method of graphics rendering comprising the steps of:

generating a first scalar product of a first vector and a second vector; and outputting said first scalar product to a graphics engine in lieu of components of said first vector.

2. The method of claim 1 wherein said outputting step comprises the step of loading said first scalar product into a predetermined component of said first vector.

3. The method of claim 1 further comprising the steps of:

generating a second scalar product of said first vector and a third vector; and outputting said second scalar product to said graphics engine in lieu of components of said first vector.

4. The method of claim 3 wherein said step of outputting said second scalar product comprises the step of loading said second scalar product into a predetermined component of said first vector.

5. The method of claim 2 wherein said outputting step further comprises the step of storing said first vector in memory.

6. The method of claim 1 further comprising the steps of:
assigning a first set of values to components of said first vector in said graphics engine; and
assigning a second set of values to components of said second vector in said graphics engine.

7. The method of claim 6 wherein said first set of values comprises (0.0, 0.0, 1.0) and said second set of values comprises (0.0, 1.0, 0.0).

8. The method of claim 5 wherein said step of storing said first vector in memory further comprises the step of casting out said first vector from a cache to said memory.

9. The method of claim 1 wherein said first vector comprises a unit normal vector and said second vector comprises a light vector.

10. The method of claim 3 wherein said third vector comprises a half vector.

11. A data processing system comprising:
circuitry operable for generating a first scalar product of a first vector and a second vector; and
circuitry operable for outputting said first scalar product to a graphics engine in lieu of components of said first vector.

12. The data processing system of claim 11 wherein said circuitry operable for outputting comprises circuitry operable for loading said first scalar product into a predetermined component of said first vector.

13. The data processing system of claim 11 further comprising:
circuitry operable for generating a second scalar product of said first vector and a third vector; and
circuitry operable for outputting said second scalar product to said graphics engine in lieu of components of said first vector.

14. The data processing system of claim 13 wherein said circuitry operable for outputting said second scalar product comprises circuitry operable for loading said second scalar product into a predetermined component of said first vector.

15. The data processing system of claim 12 wherein said circuitry operable for outputting further comprises circuitry operable for storing said first vector in memory.

16. The data processing system of claim 11 further comprising:
circuitry operable for assigning a first set of values to components of said first vector in said graphics engine; and
circuitry operable for assigning a second set of values to components of said second vector in said graphics engine.

17. The data processing system of claim 16 wherein said first set of values comprises (0.0, 0.0, 1.0) and said second set of values comprises (0.0, 1.0, 0.0).

18. The data processing system of claim 15 wherein said circuitry operable for storing said first vector in memory further comprises circuitry operable for casting out said first vector from a cache to said memory.

19. The data processing system of claim 11 wherein said first vector comprises a normal vector and said second vector comprises a light vector.

20. The data processing system of claim 13 wherein said third vector comprises a half vector.

21. A computer program product operable for storage on program storage media, the program product operable for graphics rendering, said program product comprising:
programming for generating a first scalar product of a first vector and a second vector; and
programming for outputting said first scalar product to a graphics engine in lieu of components of said first vector.

22. The program product of claim 21 wherein said programming for outputting comprises programming for loading said first scalar product into a predetermined component of said first vector.

23. The program product of claim 22 further comprising:
programming for generating a second scalar product of said first vector and a third vector; and
programming for outputting said second scalar product to said graphics engine in lieu of components of said first vector.

24. The program product of claim 23 wherein said programming for outputting said second scalar product comprises programming for loading said second scalar product into a predetermined component of said first vector.

25. The program product of claim 22 wherein said programming for outputting further comprises programming for storing said first vector in memory.

26. The program product of claim 21 further comprising:
programming for assigning a first set of values to components of said first vector in said graphics engine; and
programming for assigning a second set of values to components of said second vector in said graphics engine.

27. The program product of claim 26 wherein said first set of values comprises (0.0, 0.0, 1.0) and said second set of values comprises (0.0, 1.0, 0.0).

28. The program product of claim 25 wherein said circuitry operable for storing said first vector in memory further comprises circuitry operable for casting out said first vector from a cache to said memory.

29. The program product of claim 21 wherein said first vector comprises a normal vector and said second vector comprises a light vector.

30. The program product of claim 23 wherein said third vector comprises a half vector.

31. A graphics processor comprising:
circuitry operable for receiving first and second scalar products from a central processing unit (CPU);
circuitry operable for rendering a graphics object in response to said first and second scalar products.

32. The graphics processor of claim 31 further comprising:
circuitry operable for receiving component values of first, second, and third vectors;
circuitry operable for generating said first and second scalar products in response to said component values of said first, second, and third vectors; and
circuitry operable for suppressing said circuitry operable for generating said first and second scalar products in response to a control signal.

33. The graphics processor of claim 32 wherein said control signal is provided by said CPU.

* * * * *